A. J. ERICKSON.
VEHICLE STRUCTURE.
APPLICATION FILED NOV. 30, 1914.
1,162,465.
Patented Nov. 30, 1915.
4 SHEETS—SHEET 1.
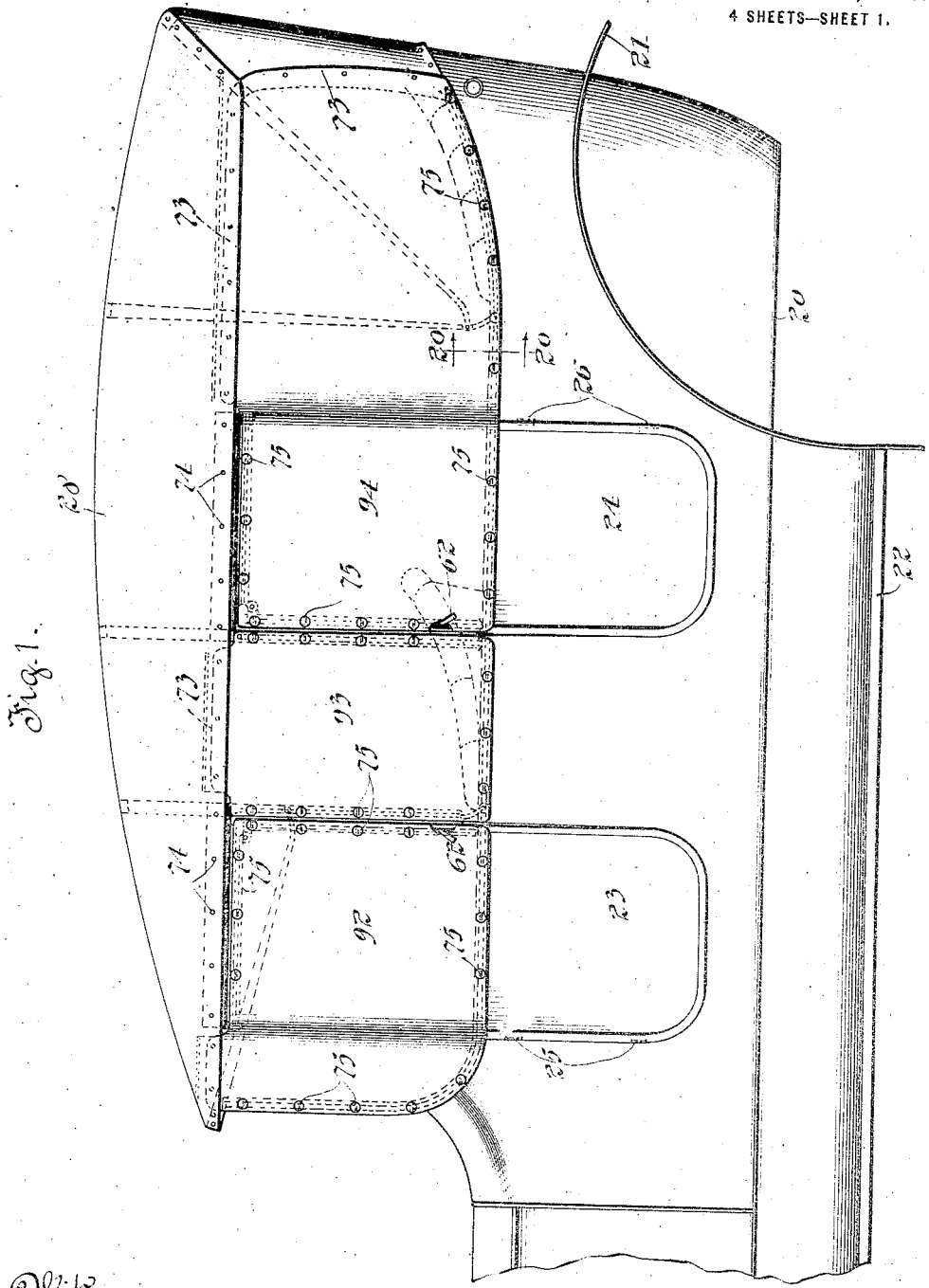
Witnesses
Robert H. Weir
Arthur W. Carlson
Inventor
Albin J. Erickson
by Foree Bain May
Attys.

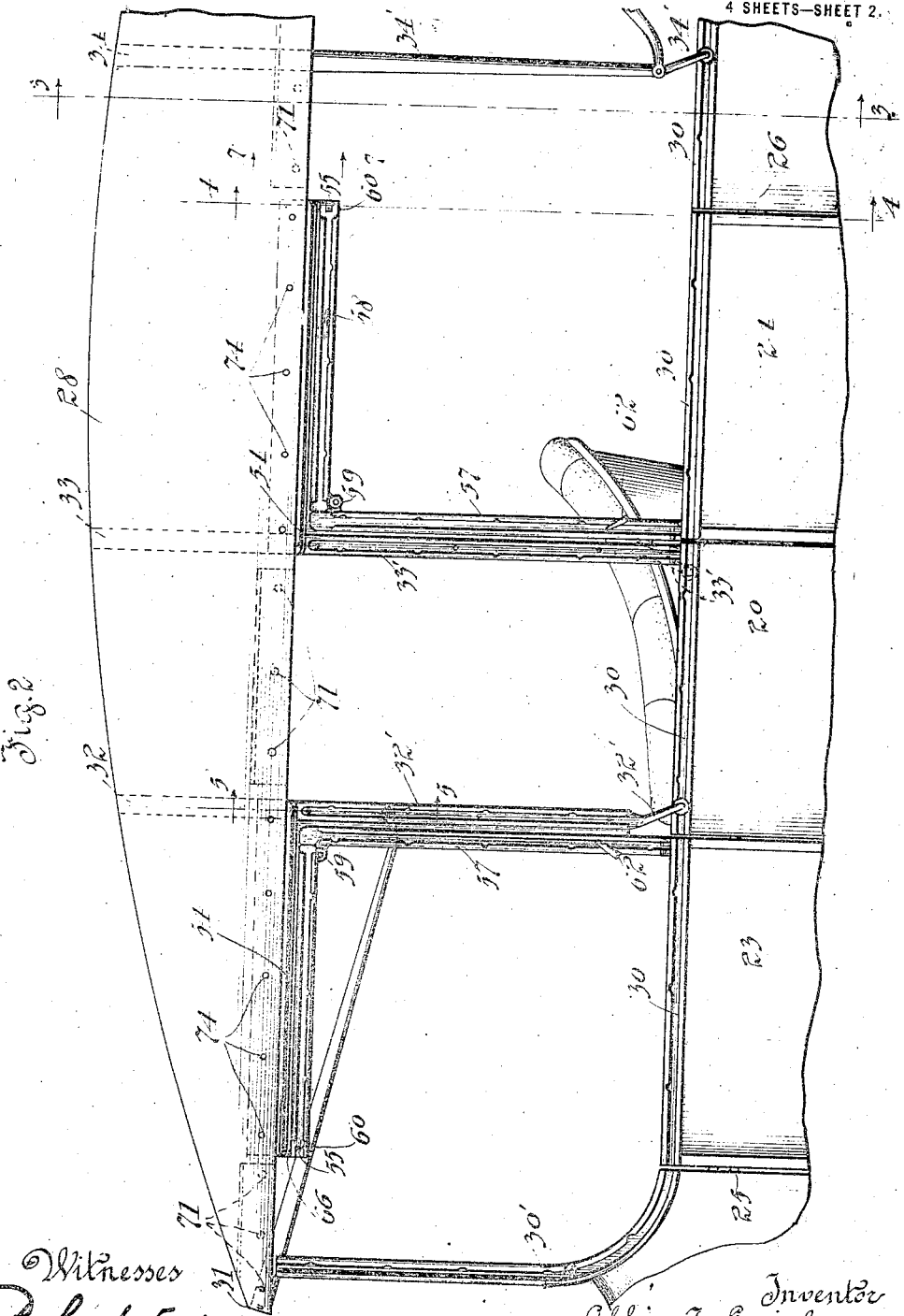

A. J. ERICKSON.
VEHICLE STRUCTURE.
APPLICATION FILED NOV. 30, 1914.
1,162,465.
Patented Nov. 30, 1915
4 SHEETS—SHEET 3.
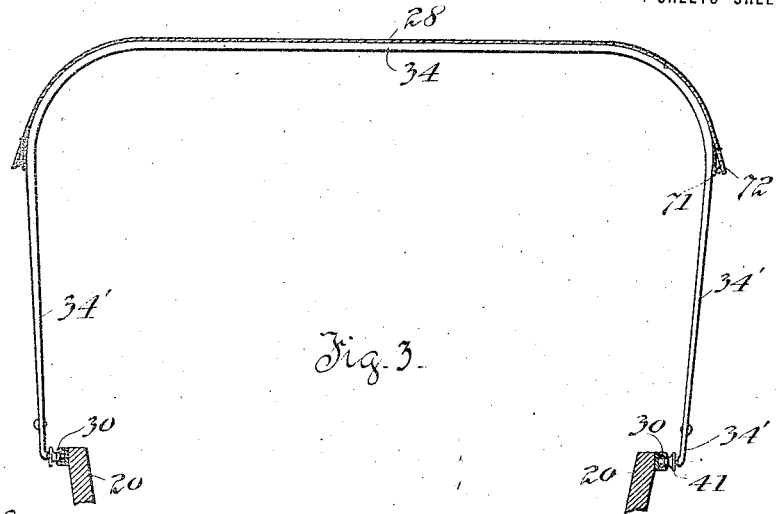
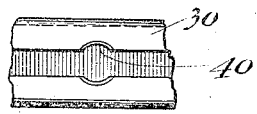
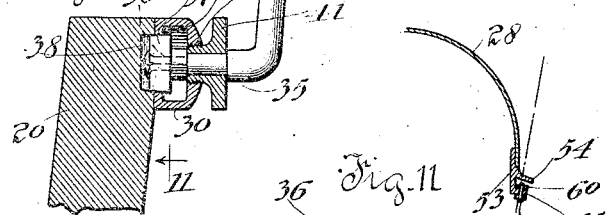
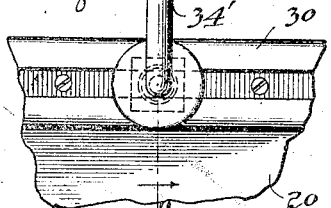
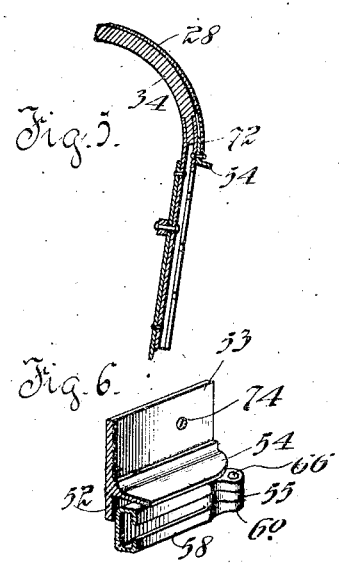
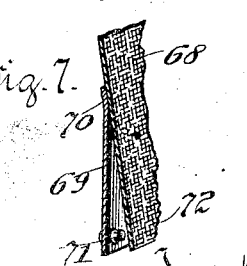
Witnesses
Robt H. Weir
Arthur W. Carlson
Inventor
Albin J. Erickson
by Foree Bain May
Attys.

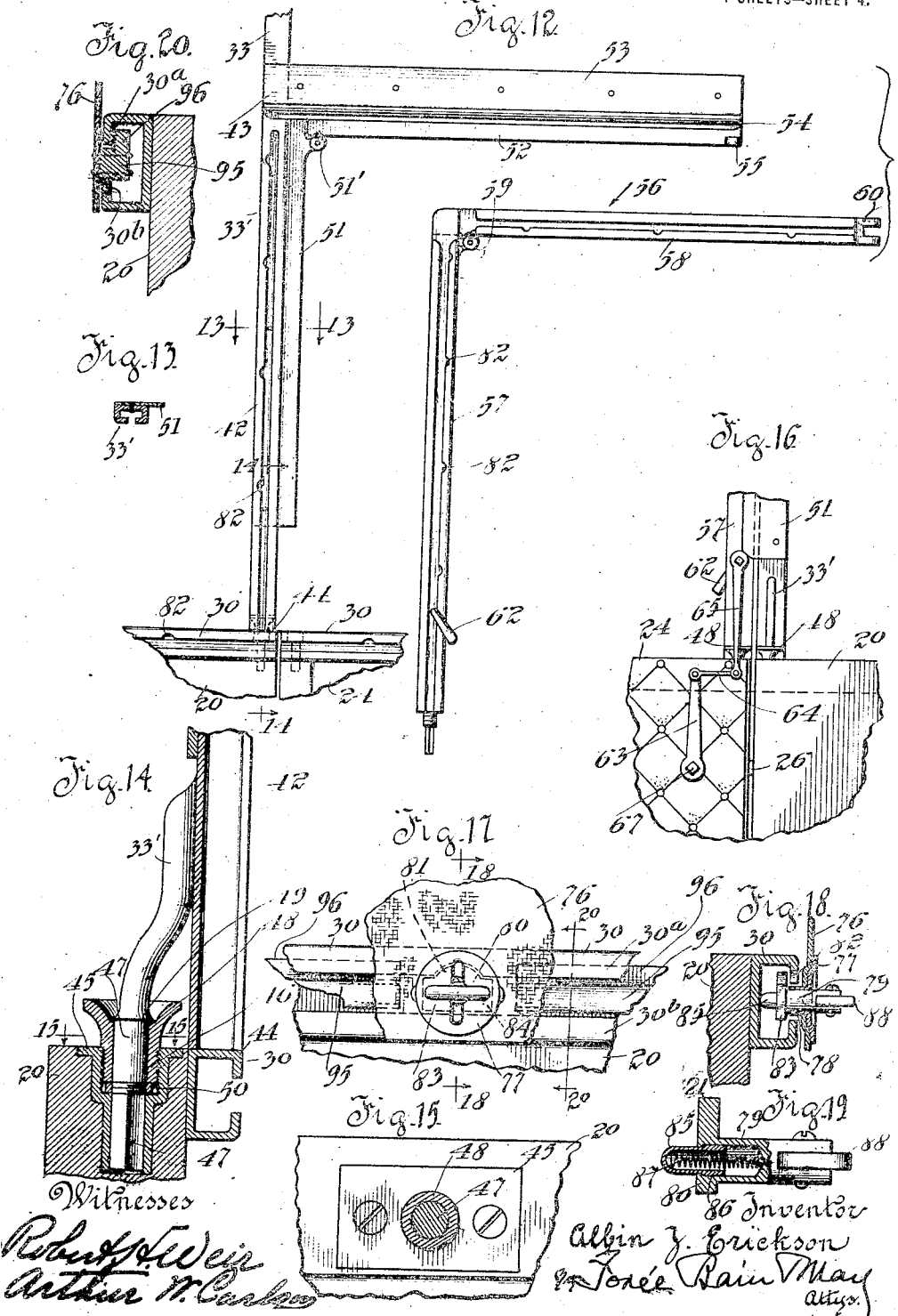

UNITED STATES PATENT OFFICE.

ALBIN J. ERICKSON, OF CHICAGO, ILLINOIS.

VEHICLE STRUCTURE.

1,162,465.   Specification of Letters Patent.   Patented Nov. 30, 1915.

Application filed November 20, 1914. Serial No. 874,351.

*To all whom it may concern:*

Be it known that I, ALBIN J. ERICKSON, a citizen of the United States, residing at Chicago, in the county of Cook and State of Illinois, have invented certain new and useful Improvements in Vehicle Structures, of which the following is a specification.

My invention relates to improvements in vehicles and has especial reference to housings or inclosures for automobiles.

One of the objects of my invention is to provide removable means for converting an ordinary Cape Town top or curtain structure of passenger cars into closed housings, thereby to adapt such vehicles for summer and winter uses.

Another object of my invention is to provide, in connection with a structure of this character, a continuous sectional molding, secured along the edges of the side walls of the car body, whereby to facilitate the operation of folding back the top and affording convenient means for securing the lower edges of the curtains to the body. And still another object of my invention is to provide removable door extension frames, having means to secure the edges of the curtains thereto, whereby to make a weatherproof inclosure.

Other and further objects of my invention will become apparent to persons skilled in the art from a consideration of the following description when taken in conjunction with the drawings wherein;—

Figure 1 is a side elevation of a fragmentary portion of an automobile body and top showing the interior inclosed by the curtains. Fig. 2 is an enlarged view of a portion of the top portion showing the frame as it appears when the curtains are removed. Fig. 3 is a transverse section of the rear portion taken on line 3—3 of Fig. 2. Fig. 4 is a similar sectional view taken on line 4—4 of Fig. 2. Fig. 5 is a transverse sectional view taken on line 5—5 of Fig. 2. Fig. 6 is a sectional perspective view of the fragment of the removable door frame. Fig. 7 is a similar view taken on line 7—7 of Fig. 2. Fig. 8 is an elevation of a fragment of the channel molding that extends around and is mounted on the upper marginal edge of the body part. Fig. 9 is a sectional view through one of the sustaining standards, and the channel molding taken on line 9—9 of Fig. 10. Fig. 10 is a side elevation of the same. Fig. 11 is a transverse sectional view taken on line 11—11 of Fig. 9. Fig. 12 is an enlarged elevation of the detachable folding door frame and jamb. Fig. 13 is a transverse sectional view taken on line 13—13 of Fig. 12. Fig. 14 is an enlarged vertical sectional view taken on line 14—14 of Fig. 12. Fig. 15 is a transverse sectional view taken on line 15—15 of Fig. 14. Fig. 16 is a fragmentary elevation of the parts of the door, its removable frame and jamb showing the attachment for the door latch. Fig. 17 is an elevation of means for fastening the curtains to the channel molding. Fig. 18 is a transverse sectional view taken on line 18—18 of Fig. 17. Fig. 19 is an enlarged view, partly in section of the catch member, shown in Figs. 17 and 18. Fig. 20 is a sectional view of the edge of the curtain and the molding, taken on line 20—20 of Fig. 1 showing a leather bead at the edge of the curtain to provide a wind proof joint.

In all the views the same reference characters are employed to indicate similar parts.

In the exemplification which I have chosen for the purpose of illustration 20 is the body part of an automobile, 21 is the rear wheel guard, 22 is the step, 23 and 24 are the usual doors hinged to the body part as at 25 and 26 respectively. As usual with automobiles of this character the main doors 23 and 24 do not extend above the upper marginal boundary of the body part as shown clearly in Fig. 2. With tops 28 of the character shown the side curtains are usually buttoned to the lower marginal edge of the top or canopy and extend to the upper marginal edge of the body part, where they are fastened by the usual carriage buttons.

Around the upper edges of the doors and the body part 20, I secure a hollow channel molding 30. Between the body part 20 and the doors 23 and 24 sections of the molding are fastened, so as to permit the opening of the doors. I also extend the molding vertically near the front, as shown at 30', on each side of the wind shield, and make substantially a wind proof joint between the frame of the wind shield and said molding.

The canopy, or top 28, is provided with top supporting bows 31, 32, 33 and 34, as shown in dotted lines in Fig. 2. Each vertical portion 34' of the bow 34, is of the usual form with the exception that its lower end is fashioned somewhat after that shown in Figs. 9, 10 and 11. The laterally projecting stud 35 is squared at its end, as at 36, and secured thereto is a nut 37. At proper intervals along the upper edge of the body 20 at the points where the supporting bows are to be fixed, squared recesses 38 and 39 are made into the body part and cut from the back of the molding 30, to receive the squared nut. The thumb nut 41 is screw threaded into the orifice 40, provided in the molding 30 in such manner as to press the nut 37 into the orifices 38 and 39 thereby to rigidly hold the bow 34 in vertical position. To move the bow 34 longitudinally of the body, when such movement is required, the nut 41 is unscrewed, and the bow 34 is thereby pulled laterally so that the nut 37 is withdrawn from the orifices 38 and 39 into the channel of the molding 30 in which it is free to be moved longitudinally for the purpose of moving the bows toward the back end of the vehicle when it is desider to fold the top. The legs 32'—32' of the bow 32 may also be fixed to the molding 30 in the manner just described.

Another means of holding the vertical members 32' to 34' of the bows, 32 to 34 inclusive, to the upper edge of the body part is shown in Figs. 14, 15 and 16 and this latter method of fastening the bows to the upper edge of the body part may be employed when the molding 30 is not used. It is also a convenient manner of fastening the upper door frame to the bottom portion of the door. The lower end 33' of the bow 33, may be secured to a section of vertically extending molding 42 which may be secured to the upper portion of the bow 33, as at 43. The lower end of the molding 42 rests upon the upper surface of the molding 30 as at 44. In the upper surface of the frame 20, is a vertically disposed socket 45, enlarged and screw threaded, as at 46, and provided with a square hole for receipt of the squared member 47 which is deflected laterally from the vertical member 42. Surrounding the round portion 47 of the member 33' is a nut 48 which is adapted for screw threaded engagement with the orifice 46 in the thimble 45. The shoulder 49 overlies the bore of the nut 48 and a similar shoulder 50 is provided at the other end of the nut on the stem 33', so that when the nut 48 is screwed into the orifice 46, the squared end 47' of the stem will be forced into the squared socket, by the operation of the nut, until the lower end of the member 42 is brought into substantial contact with the upper surface of the molding 30.

The vertical member 42 is provided with a vertical plate 51 which serves as a door jamb for the door, and a similar plate 52, which extends laterally from the vertical jamb member 51 and which is a part of the member 53, is secured to the vertical member, as at 43, a hinge 51' permits the members 51 and 53 to be folded together when not in use. The member 53 is also provided with a forwardly extending cope 54 which projects over the joint formed by the door frame and the jamb part 52 when the door is closed to shed water that may come down from the top and to provide thereby a more wind and weather-proof joint between the door and jamb.

At the extreme end of the member 53 is a hinge member 55 adapted to be connected by a pintle 66 to the frame member, generally indicated at 56. The members 57 and 58 are made up, preferably, of molding, such as the molding 30 and are hinged together, as at 59. The upper member 58 is provided on its free end with a hinge member 60, adapted for engaging coöperation with the hinge member 55, which is a part of the jamb member 53. The lower end of the vertical member 57 is provided with a square stud 47 and a threaded nut 48, adapted for a socket similar to the socket 45, provided in the upper surface of the door 24.

When the lower free ends of the members 57 are secured to the doors 23 and 24, in the manner described, and a pintle 66 unites the hinge members 55 and 60, thereby joining the removable jamb members 51 and 52 by hinge connection with the removable door frame 56, the door may be freely opened and closed, the hinges 55 and 56 being in the same vertical plane as the hinges for the main portions 23 and 24 of the doors, as clearly shown in Fig. 2. The jamb members 51 and 52 are also hinged together as at 51' to permit them to fold together.

A supplementary handle 62, for the door latch, may be provided near the lower end of the vertical member 57 of the door frame. In Fig. 16 the interior of the body of the vehicle is shown, wherein the usual handle 63 is connected by a link 64 to a lever 65 projecting downwardly from the handle 62. So that when the door extension frame 56 is mounted upon the body portion 24 of the door, the handle 62 may be employed and used from the outside of the housing in connection with or instead of the usual handle, connected to the lever 63, as at 67, upon the inside of the door. Secured to the lower edge of the weatherproof fabric 68, of the canopy 28, and longitudinally between the said door jambs, is a strip 69, fastened to the fabric 68, as at 70, and having its lower edge provided with clasp button studs 71, at proper intervals, to engage coöperating clasp members on curtains that may be secured in place by the clasps between the strip 69 and the lower edge 72 of the fabric, whereby to provide a wind and weather proof interlapped joint between the removable curtain and the fixed part 69 of the top structure. This arrangement of the curtains is clearly shown as at 73 of Figs. 1, 3 and 7. The door jamb member 53 is secured to the said fabric in the same manner, by studs or perforations 74, the edges of the appropriate curtains may also be secured to the molding 30, as at 75, as clearly shown in Fig. 1, by means of clasps or clips illustrated more clearly in Figs. 17, 18 and 19, wherein the curtain fabric 76 is provided with a gromet or plate 77, having a cylindrical extension 78 through which a stem 79 passes. The stem 79 is provided with a plate extension, 80, as shown in plan view in Fig. 17, and it will be observed that there is a curved projection 81, on this plate, which is practically of the same contour as the notches 82 provided at intervals in the molding 30. The extensions 81, 83 and 84, of the plate 80, will engage the overlying rims 30$^a$ and 30$^b$ of the channel 30 when the stem 79 has been rotated 90 degrees so that when the plate 80 is placed in the channel opening opposite one of the notches 82, and the device moved longitudinally of the channel 30, the stud 79 may then be rotated one-quarter of a revolution, the projections 83 and 84 will now engage the members 30$^a$ and 30$^b$ and hold the curtain smoothly in its proper place. To prevent rattling of the catches against the molding I provide a hollow closed-end sleeve 85, provided with a shoulder 86, and passing into the hollow stem 79, being yieldingly pressed outwardly by the open compression spring 87. This spring and sleeve press the plate 80 into contact with the members 30$^a$ and 30$^b$ of the molding 30 and prevent rattling or noise. To remove the curtains it is only necessary to move the catch to a position in the molding 30 where a notch 82 is present and turn the stem 79 a quarter of a revolution by the thumb piece 88 when the plate 80 may be removed from the molding and the curtain thereby disengaged.

The curtains 92, 93 and 94 on each side of the housing are removable. The curtains 92 and 94 extend over the body part and the respective doors, and when the doors are opened the curtains will be flexed in the vertical plane of the hinges 55, 60 and 26, or 25, as the case may be.

The curtains are provided with selvage beading 95, made of leather or other suitable material, having a lip 96 to under-lie the flange 30$^a$ of the molding 30 to thereby provide wind proof joints between said curtains and molding. The beading is entered in the slot of the molding by first placing the tongue 96 in the slot while the edge of the curtain is out turned and then pushing the main portion of the bead into the slot between the flanges 30$^a$ and 30$^b$. The bead and curtain may be slid longitudinally of the slot to engage the fastening catches 80.

It is, of course, manifest that illuminated panels may be provided in these curtains as usual, without interfering with the operation of the structure.

When the curtains and the door frames have been removed, the car is thereby adapted for summer use and when it is desirable to let the top down the vertical members of the bows 32, 33 and 34 may be slid in the molding 30, until they have reached the proper respective positions to permit the depression of the top.

When the nut 41 is loosened, withdrawing the squared nut from the socket into the channel of the molding 30, a bow 34' may be slid freely within the molding.

While I have herein shown and described a single embodiment of my invention for the purpose of clear disclosure it is evident that considerable change in the configuration and disposition of the parts may be made within the scope of the appended claims.

Having described my invention, what I claim is:—

1. The combination with an automobile body having side doors, of a flexible folding top therefor, supports for said top occupying vertical position when the top is extended, a jamb member secured to one of said supports and projecting therefrom across the doorway to the opposite side thereof, a folding door frame hinged to the projecting end of said jamb and secured to the automobile door to move therewith.

2. The combination with an automobile body having side doors, of a flexible folding top therefor, supports for said top occupying vertical positions when the top is extended, a jamb member secured to one of said supports and projecting therefrom across the doorway to the opposite side thereof, a folding door frame hinged to the projecting end of said jamb and secured to the door to move therewith, and a side curtain having catches to engage said folding door frame.

3. The combination with an automobile body having side doors, of a flexible folding top therefor, supports for said top occupying vertical positions when the top is extended, a jamb member secured to one of said supports and projecting therefrom across the doorway to the opposite side thereof, a folding door frame comprising two pivoted members, one projecting end being hinge connected to the projecting end of said jamb member and the other end secured to the door to move therewith, and a side curtain detachably connected to said door frame.

4. In a device of the character described, a bow; a supporting means therefor, comprising a stem having an angular end, laterally deflected therefrom; a freely turning threaded nut on said stem; means to prevent axial movement of the nut on the stem and a screw threaded socket, to be carried by the body, having an enlarged threaded part to receive the nut and a smaller angular part to receive the free angular end of the stem, to support the bow.

5. In a device of the character described, an automobile body; a channel molding secured thereto in combination with a curtain catch comprising a stem passing through the curtain; a plate on the end of the stem, adapted for insertion within the molding channel and a spring pressed member to prevent loose contact between said catch and molding.

In testimony whereof I hereunto set my hand in the presence of two subscribing witnesses.

ALBIN J. ERICKSON.

In the presence of—
MARY F. ALLAN,
GEO. T. MAY, Jr.